United States Patent [19]

Ono et al.

[11] 4,390,601
[45] Jun. 28, 1983

[54] MAGNETIC RECORDING MEDIUM AND PROCESS FOR THE PRODUCTION THEREOF

[75] Inventors: Yoshihiro Ono; Akira Nabara; Tomoaki Ikeda, all of Asaka, Japan

[73] Assignee: Fuji Photo Film Co., Ltd., Kanagawa, Japan

[21] Appl. No.: 165,439

[22] Filed: Jul. 2, 1980

[30] Foreign Application Priority Data

Jul. 2, 1979 [JP] Japan .................................. 54-82706
Jul. 2, 1979 [JP] Japan .................................. 54-82707
Jul. 2, 1979 [JP] Japan .................................. 54-82709
Jul. 2, 1979 [JP] Japan .................................. 54-82710

[51] Int. Cl.$^3$ ............................................ H01F 10/00
[52] U.S. Cl. .................................... 428/412; 204/192; 204/192 SP; 204/192 N; 427/50; 427/131; 427/132; 427/250; 427/255.2; 427/255.3; 427/255.6; 427/255.7; 427/294; 427/295; 427/296; 428/477.7; 428/480; 428/484; 428/522; 428/532; 428/695; 428/900

[58] Field of Search ................. 427/131, 132, 50, 250, 427/255.2, 255.3, 255.6, 255.7, 294, 295, 296; 428/412, 477.7, 480, 484, 522, 532, 695, 900; 204/192 SP, 192 N

[56] References Cited

U.S. PATENT DOCUMENTS

| | | | |
|---|---|---|---|
| 3,466,156 | 9/1969 | Peters et al. | 427/132 |
| 3,516,860 | 6/1970 | Simmons | 427/132 |
| 4,124,736 | 11/1978 | Patel et al. | 427/132 X |
| 4,171,399 | 10/1979 | Allen | 427/131 X |
| 4,188,434 | 2/1980 | Loran | 427/131 X |
| 4,260,466 | 4/1981 | Shirahata et al. | 427/132 X |

FOREIGN PATENT DOCUMENTS 47-28042  7/1972  Japan .

Primary Examiner—Bernard D. Pianalto
Attorney, Agent, or Firm—Sughrue, Mion, Zinn, Macpeak & Seas

[57] ABSTRACT

A magnetic recording medium comprising a non-magnetic support having thereon a vapor-deposited solid film of a ferromagnetic material formed by vacuum evaporation, on the surface of said magnetic recording medium being further provided a vapor deposited film of an organic lubricant, a macromolecular material or a mixture thereof.

15 Claims, 2 Drawing Figures

MAGNETIC RECORDING MEDIUM AND PROCESS FOR THE PRODUCTION THEREOF

BACKGROUND OF THE INVENTION

1. Field of the Invention

The present invention relates to a magentic recording medium and a process for the production thereof. More particularly, it is concerned with a magnetic recording medium of the kind which has a thin solid film prepared by the vacuum evaporation of a ferromagnetic material, which film has improved surface strength and slip characteristics.

2. Background of the Invention

As for magnetic recording media, those media which are produced by a coating process, in which fine powders of magnetic material, such as $\gamma\text{-Fe}_2\text{O}_3$, $\gamma\text{-Fe}_2\text{O}_3$ doped with Co, $\text{Fe}_3\text{O}_4$, $\text{CrO}_2$, ferromagnetic alloys, etc., are dispersed into organic binders, such as vinyl chloride-vinyl acetate co-polymer, styrene-butadiene copolymer, epoxy resin, polyurethane resin, etc., the resulting dispersions are coated on non-magnetic supports and then, dried, have been predominantly used. As there has been a growing demand for high density recording in recent years, much attention has been directed to thin solid films of ferromagnetic metals which are formed using a sputtering technique, a vacuum evaporation technique, an ion plating technique or the like, since these techniques have the capability of being used in producing the so-called binder-free magnetic recording medium. Various attempts have, therefore, been undertaken with the intent of using such films to practical use. However, these magnetic recording media, in which ferromagnetic thin solid films are only formed on non-magnetic supports, suffer from the disadvantage that the magnetic layers thereof are peeled off or scratched through contact with a recording head during scanning, which differs from magnetic recording media produced by the coating process.

To remove the above-described disadvantage from such recording media, Japanese patent application (OPI) No. 153707/77 discloses a process wherein the surfaces of binder-free magnetic recording media are covered with macromolecular materials using a coating technique. In addition, Japanese patent applicaton (OPI) No. 88704/78 describes a process wherein surface active agents having HLB values of 5 to 30 are provided on the surfaces of binder-free magnetic recording media by coating. In these wet processes, solvents must be used, a fear of environmental pollution exists and further, an additional equipment to prevent explosions is required. Moreover, problems arise because oxidation of the surfaces of the ferromagnetic thin solid films due to contact with air occurs, which causes a deterioration thereof, and the number of pinholes made in the ferromagnetic thin solid films with the chance of friction are unavoidable when the ferromagnetic thin solid films are removed from the vacuum system at the conclusion of the evaporation and optionally, must be handled to coat macromolecular material or surface active agents thereon. The magnetic recording media prepared by the above-described processes become valueless.

SUMMARY OF THE INVENTION

Therefore, an object of the present invention is to provide a novel magnetic recording medium and a process for the production thereof, eliminating above-described defects.

More specifically, the present invention in one embodiment provides a magnetic recording medium comprising a non-magnetic support having thereon a vapor deposited solid film of a ferromagnetic material formed by vacuum evaporation, characterized by a vapor deposited film of an organic lubricant, a macromolecular material or a mixture thereof provided on the surface of a magnetic recording medium. The present invention in another embodiment provides a process for the production of a magnetic recording medium, which comprises evaporating an organic lubricant, a macromolecular material or a mixture thereof onto a surface of a magnetic recording medium comprising a non-magnetic support having thereon a vapor deposited solid film of a ferromagnetic material formed by vacuum evaporation.

BRIEF DESCRIIPTION OF THE DRAWINGS

FIG. 1 is a schematic cross-section diagram of a simultaneous evaporation apparatus, wherein numeral 1 and numeral 2 each represents an evaporation boat, numeral 3 and numeral 4 each represents a film thickness monitor, numeral 5 represents a solid film of a ferromagnetic material, numeral 6 represents a parting strip, numeral 7 represents a vacuum bell jar and numeral 8 represents a vacuum evaporation system.

FIG. 2 is a schematic cross-section diagram of an apparatus illustrating an embodiment of the present invention, wherein numeral 1 represents a non-magnetic support, numeral 2 represents a solid film of a ferromagnetic material, numeral 3 represents a chamber for producing vapor of an organic lubricant, numeral 4 represents a lid of the chamber, numberal 5 represents an organic lubricant, numeral 6 represents vapor of the lubricant, numeral 7 represents a heat medium, numeral 8 represents a heater and numeral 9 represents a thermometer.

DETAILED DESCRIPTION OF THE INVENTION

Figure 1:
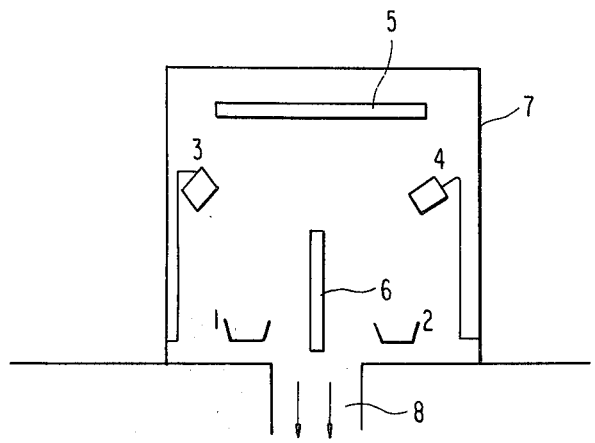

The term "vacuum evaporation" as used in the present invention includes not only conventional vacuum evaporation using a resistance heater but also vacuum evaporation utilizing electron beam heating, a sputtering process, an ion plating process and the like.

The term "lubricant" as used herein refers to a compound possessing the function that on thermal molding of plastic materials, the compound can increase the flow-ability of the plastic materials and can facilitate the release of the plastic moldings from molds, as defined in Japanese Industrial Standard JIS K 6900. The term "organic lubricants" is used to describe all of organic compounds and organometallic compounds which fall under the category of the lubricant defined above and that, exist as a solid having vapor pressure of $5 \times 10^{-5}$ Torr or lower at room temperature (about 20°–30° C.). These compounds may form vapor deposited films whose composition differs from that before the evaporation.

Preferred examples of the above-described organic lubricants include paraffin series hydrocarbons, higher fatty acids, oxyfatty acids, fatty acid amides, fatty acid esters, fatty alcohols, metal soaps and a mixture thereof. Representative examples of paraffin series hydrocarbons are natural paraffin, microcrystalline wax and the like. Representative examples of higher fatty acids are lauric acid, myristic acid, palmitic acid, stearic acid, behenic acid, oleic acid, linolic acid, linolenic acid, arachidonic acid and the like. Examples of suitable oxyfatty acids are oxystearic acid, lanopalmitic acid and the like. Representative examples of fatty acid amides are lauric acid amide, myristic acid amide, palmitic acid amide, stearic acid amide, behenic acid amide, oleic acid amide, linolic acid amide, methylenebisstearamide, ethylenebisstearamide, hardened beef tallow amide and the like. Examplary fatty acid esters are methyl stearate, cetyl palmitate, stearic acid monoglyceride and the like. Representative examples of fatty alcohols are cetyl alcohol, stearyl alcohol and the like. Representative metal soaps include those which are obtained from fatty acids having 12 to 30 carbon atoms and various metals, that is to say, those which correspond to the salts of fatty acids, such as lauric acid, myristic acid, palmitic acid, stearic acid, behenic acid, oleic acid, linolic acid, linolenic acid, arachidonic acid and so on, and metals such as zinc, copper, magnesium, nickel, iron, aluminum, lead, chromium, calcium, sodium, potassium, strontium and a mixture thereof.

As for the above-described lubricants, only one lubricant may receive an evaporation treatment to form a film coat, or two or more kinds of lubricants may receive evaporation treatments one after another to be laminated in a multilayer form or may receive their respective evaporation treatments at the same time to form a mixture layer.

Any macromolecular materials may be employed in the present invention, provided that they permit the evaporation treatment and therefore, there is no particular restriction in choosing macromolecular materials to be used, except for the above-described condition. In addition, the composition of a vapor deposited film of such a material may differ from that which the material has before evaporation. Preferable examples of such macromolecular materials as described above include polyoleffins, vinyl resins, vinylidene resins, polyesters, polycarbonates, polyamides, polyacrylonitrile, polyurethane, polyethers, cellulose resins and a mixture thereof. Of these polymers, polyoleffins such as polyethylene, polypropylene and the like, polyesters and polycarbonate are particularly favorable to be used in the present invention.

When the above-described macromoledcular material is used alone, only one kind of macromolecular material may receive an evaporation treatment to form a film coat, or two or more kinds of the macromolecular material may receive evaporation treatments one after another to be laminated in a multilayer form or may receive their respective evaporation treatments at the same time to form a mixture layer.

When the macromolecular material is used together with the organic lubricant, they may receive evaporation treatments one after another to be laminated in a multilayer form or may receive their respective evaporation treatments at the same time to form a mixture layer. In this case, a simultaneous vacuum evporation treatment as described after is particularly preferable.

In any case of using the organic lubricant alone, the macromolecular material alone or a mixture thereof, there is no need to restrict an evaporation amount of them to any special value, provided that the evaporation amount is involved in such a range that the resulting evaporation film may have both high surface strength and excellent slip characteristics. However, it is desirable to choose as small amount as possible within such a range as described above. The evaporation amount is usually 0.5 g/m² or less and more particularly, 0.2 g/m² or less. In addition, even when the evaporation film does not have the so-called layer-form structure, but has the islanded structure, it can exert its effects to the same degree as that which has the so-called layer-form structure does and therefore, it is not essential for the evaporation film to have a uniform layer-form structure. When the mixture of the organic lubricant and the macromolecular material is used, the total evaporation amount is also usually 0.5 g/m² or less and more particularly, 0.2 g/m² or less. A preferable mixing ratio (by weight) of the organic lubricant to the macromolecular material is 30% or above and more particularly, 50% or above.

Specific examples of ferromagnetic materials which can be employed for forming evaporation thin solid films in the present invention include ferromagnetic metals such as Fe, Co, Ni and the like; magnetic alloys such as Fe-Co, Fe-Ni, Co-Ni, Fe-Rh, Fe-Cu, Fe-Au, Co-Cu, Co-Au, Co-Y, Co-La, Co-Pr, Co-Gd, Co-Ga, Co-Sn, Co-Pt, Ni-Cu, Fe-Si, Fe-Co-Ni, Mn-Bi, Mn-Sb, Mn-Al and the like; magnetic oxides such as $\gamma$-$Fe_2O_3$, $Fe_3O_4$, $CrO_2$ and the like; magnetic nitrides such as $Fe_3N$ and the like; and ferrite series magnetic materials such as barium ferrite, strontium ferrite and the like.

The solid films of the above-described ferromagnetic materials are produced using a vacuum evaporation process, an ion plating process, a sputtering process, a reactive evaporation process or the like.

Moreover, the above-described ferromagnetic thin solid films can have, in the present invention, structures such that they are the layers of mixtures of ferromagnetic materials with non-magnetic materials, they are multilayer films constructed of ferromagnetic thin films and non-magnetic materials layers provided thereon, or they have, between non-magnetic supports and the ferromagnetic layers, layers of non-magnetic materials differing from those which the supports are made.

Specific examples of non-magnetic supports which can be used in the present invention include supports of non-magnetic materials such as polyethylene terephthalate, polyimide, polyvinyl chloride, cellulose triacetate, polycarbonate, polyethylene naphthalate, glass, ceramics and so on; and the supports of metals such as aluminum, stainless steel, brass and so on. In addition, those supports obtained by forming metallic layers on the above-described supports using an evaporation process or a metal plating process, and those supports obtained by coating adhesives on the above-described supports may be also employed as the supports for the ferromagnetic thin films of the present invention. These supports may be used in any forms; for example, tapes, sheets, cards, disks, drums and so on.

In the process for the production of the magnetic recording medium of the present invention, evaporation of the organic lubricant, the macromolecular material or the mixture thereof is performed by conventional vacuum evaporation using a resistance heater, vacuum evaporation utilizing electron beam heating, a sputtering process or an ion plating process.

When the mixture of the organic lubricant and the macromolecular material is used, a simultaneous vacuum evaporation method is particularly preferable.

The term simultaneous evaporation refers to a process wherein substances to be evaporated are admitted into separate evaporation sources and are simultaneously evaporated onto the same surface to be covered as their respective evaporation conditions are controlled independently, and it has already come into use as a known technique in evaporation correlated arts.

Further, the evaporation may be also performed by exposing the surface of the magnetic recording medium to the vapor of the organic lubricant, the macromolecular material or the mixture thereof under normal pressure.

In such the evaporation treatment, vapors of substances to be evaporated (i.e., the organic lubricant, the macromolecular material or the mixture thereof) can be obtained by such treatment as heating is continued so as to keep the temperatures of the substances at their respective boiling points, sublimation points or temperatures lower than decomposition points.

Since thin solid films of ferromagnetic material provided on non-magnetic supports by the vacuum evaporation technique or the like are known to have structures of the kind which are abundant in voids, it is thought that when the thin solid films of ferromagnetic materials are exposed to vapors of the substances, the vapors can permeate into the above-described voids to result in the conversion of their structures into practically compact structures and therefore, in this case, improvements upon the surface strength and the slip characteristics of the thin solid film are attained with small amounts of the substances.

On the occasion that the medium is heated or treated with compressive stress applied by means of a calender roll or the like after exposure to vapor of the substances, the substances can be dispersed more deeply and more widely into the thin solid film of ferromagnetic materials and thereby, further improvements in the film surface strength and slip characteristics can be attained.

Further, when the surface of the magnetic recording medium is continuously exposed to vapors of the substances, a vapor deposited film of the substances can be formed on the surface of the magnetic recording medium.

The above-described evaporation treatment is preferably applied to the organic lubricants.

In accordance with embodiments of the present invention, magnetic recording media suitable for high density recording are provided without the necessity for complicated production steps, which include, for example, preparing magnetic materials, preparing coating solutions, coating them and so on, unaccompanied by problems that it is necessary to recover the solvents used or to take some precautions to prevent environmental pollution from the solvents used, because no solvents are used in the present invention, and that, without requiring any additional equipments for prevention of explosion. In addition, according to embodiments of the present invention, magnetic recording media which have excellent recording and playing back characteristics can be provided, because the production of a magnetic recording medium can be carried out inside a vacuum line during all production steps to result in prevention of undesirable phenomena, such as deterioration of a ferromagnetic material resulting from air oxidation, generation of pinholes caused by scratches, delamination of the recording layer, adhesion of dust or other foreign substances and so on, from occuring and a consequent market reduction of the dropout phenomenon. Therefore, the magnetic recording media of the present invention have great value from an industrial point of view.

The present invention is illustrated in greater detail by reference to the following example. However, the invention is not intended to be construed as being limited to this example. Unless otherwise indicated, all parts, percents, ratios and the like are by weight.

EXAMPLE 1

A support of a polyethylene terephthalate film having a thickness of $25\mu$ was arranged in a vacuum evaporation apparatus so as to incline at an angle of 60 degrees to an evaporation source. The pressure inside the vacuum apparatus was reduced to $1 \times 10^{-5}$ Torr, and cobalt metal having a purity of 99.99% was evaporated onto the support with an evaporation rate of 2 Å/sec using the heating technique utilizing electron beams to form an evaporation cobalt film having a thickness of 200 Å. Then, the pressure inside the vacuum apparatus was altered to $5 \times 10^{-5}$ Torr, and behenic acid was evaporated onto the thus obtained cobalt film with an evaporation rate of 5 Å/sec using the electric resistance heater to form an evaporation behenic acid film having a thickness of 300 Å. The values regarding thickness were, therein, those determined by converting the amounts each adhered to a quartz oscillating type film thickness monitor, Model DTM-200 produced by Sloan Instruments Corp. (U.S.) into their respective thicknesses. The surface strength of the thus obtained sample was measured with "HEIDON-18" scratch resistance tester produced by Shinto Kagaku, K.K. using an R ball stylus (R=0.1 mm), and the least load with which the film surface could be scratched was taken as an indication of the film surface strength. The sample having the evaporation film coat of behenic acid could be scratched with a load of 130 g, while a comparison sample in which any evaporation film coat of behenic acid was not provided could be scratched with a load of 30 g. Accordingly, a surface strength higher than that of the comparison sample by a factor of 4 or above was attained by the evaporation of behenic acid. These samples exhibited excellent magnetic characteristics, whether the evaporation film coat of behenic acid is present or not and that, power loss due to the formation of behenic acid coat did not occur.

EXAMPLE 2

An evaporation iron film having a thickness of 200 Å was prepared in the same manner as in Example 1. Next, stearic acid amide was evaporated onto the resulting iron film with a evaporation rate of 5 Å/sec to form an evaporation stearic acid amide film 200 Å thick. The surface strength of the thus obtained sample was measured in the same manner as in Example 1, and the load of 100 g was found to make a scratch on the surface of the sample. Namely, the surface strength of this sample was 3 times or more that of the comparison sample in which any evaporation film coat of stearic acid amide was not provided. Any change in magnetic characteristics due to the formation of the evaporation stearic acid amide film was not observed and further, power loss due to the presence of the evaporation stearic acid amide film did not occur.

EXAMPLE 3

A support of a polyethylene terephthalate film having a thickness of $25\mu$ was arranged in a vacuum evaporation apparatus so as to incline at an angle of 60 degrees to an evaporation source. The pressure inside the vacuum apparatus was reduced to $1 \times 10^{-5}$ Torr, and cobalt metal having a purity of 99.99% was evaporated onto the support with an evaporation rate of 2 Å/sec using the heating technique utilizing electron beams to form an evaporation cobalt metal film having a thickness of 2,000 Å. Subsequently, the pressure inside the vacuum apparatus was altered to $5 \times 10^{-5}$ Torr and then, each of macromolecular material set forth in Table 1 was evaporated onto the evaporation cobalt metal film with an evaporation rate of 5 Å/sec using the electric resistance heater to form an evaporation film of the respective macromolecular material which had a thickness of 500 Å. The surface strength of each of the thus obtained samples was measured with a scratch resistance tester of "HEIDON-18" produced by Shinto Kagaku K.K. using an R ball stylus (R=0.1 mm). Therein, the least load with which the film surface could be scratched was employed as an indication of the film surface strength. The surface strength values of each samples are shown in Table 1. As can be seen from Table 1, the strength was greatly enhanced by the evaporation of a macromolecular material thin film. The magnetic characteristics of the magnetic recording medium was not changed by the formation of an evaporation film of a macromolecular material and further, power loss due to the presence of the evaporation film was small. In addition, each of these samples was submitted to a forced deterioration treatment under the circumstance of a temperature of 60° C. and a relative humidity of 90% and thereby, rust and spots were caused in the samples of this invention to greatly reduced degrees, compared with the comparison sample in which any evaporation film coats of macromolecular materials were not provided. These experiments indicate that the samples obtained in this example were hardly affected by the variations in temperature and humidity.

TABLE 1

| Macromolecular Material Used | Maker | Surface Strength |
|---|---|---|
| Sanwax #150 (Polyethylene) | Sanyo Chemical Industries Co., Ltd. | 180 g |
| Viron V-200 (Polyester) | Toyo Spinning Co., Ltd. | 100 g |
| Tafuron F-6000 (Polycarbonate) | Idemitsu Kosan Co., Ltd. | 80 g |
| Nothing | | 30 g |

EXAMPLE 4

A support of a polyethylene terephthalate film having a thickness of 25μ was arranged in a vacuum evaporation apparatus so as to incline at an angle of 60 degrees to an evaporation source. The pressure inside the vacuum apparatus was reduced to $1 \times 10^{-5}$ Torr, and cobalt metal having a purity of 99.99% was evaporated onto the support with an evaporation rate of 2 Å/sec using the heating technique utilizing electron beams to form an evaporation cobalt metal film having a thickness of 2,000 Å. After sufficient cooling, the thus obtained film was taken out of the apparatus and transfered into other vacuum evaporation apparatus. Stearic acid amide was put in an evaporation boat indicated at 1 in FIG. 1, and Viron V-200 (trade name of polyester produced by Toyo Spinning Co., Ltd.) was put in the other evaporation boat indicated at 2 in FIG. 1. Then, they were heated independently to provide a simultaneous evaporation film on the above-described film. The evaporation amount of stearic acid amide was read in a film thickness monitor 3 of quartz occilator type (Model DTM-200 produced by Sloan Instruments Corp. (U.S)) and separately, that of Viron V-200 was read in the other monitor 4 of the same type. The simultaneous evaporation amount of stearic acid amide and that of Viron V-200 were 200 Å respectively. The film surface strength of the thus obtained sample was measured with "HEIDON-18" scratch resistance tester produced by Shinto Kagaku K.K. using a R ball stylus (R=0.1 mm). Therein, the least load with which the film surface could be scratched was employed as an indication of the film surface strength. The sample having the simultaneous evaporation film of stearic acid amide and Viron V-200 could be scratched with a load of 160 g, while the comparison sample having the evaporation film of cobalt alone could be scratched with a load of 30 g. The simultaneous evaporation resulted in five-fold or more enhancement of the film surface strength. No difference in magnetic characteristics between the sample having the above-described simultaneous evaporation film and the sample not having it was noticed and that, power loss did not occur.

EXAMPLE 5

An evaporation cobalt film 200 Å thick was provided in the same manner as in Example 4. Thereonto, behenic acid and Sanwax (trade name of polyethylene produced by Sanyo Chemical Industries Co., Ltd.) were submitted to the simultaneous evaporation treatment to provide a film coat wherein the function of behenic acid and that of Sanwax were 200 Å and 270 Å, converted to a thickness basis, respectively. Upon the measurement of the film surface strength which was carried out in the same manner as in Example 4, scratches were made with the least load of 150 g, which value was 5 times that of the comparison sample which did not have the simultaneous evaporation film.

EXAMPLE 6

A support of a polyethylene terephthalate film having a thickness of 25μ was arranged in a vacuum evaporation apparatus so as to incline at an angle of 60 degrees to an evaporation source. The pressure inside the vacuum apparatus was reduced to $1 \times 10^{-5}$ Torr, and cobalt metal having a purity of 99.99% was evaporated onto the support with an evaporation rate of 2 Å/sec using the heating technique utilizing electron beams to form an evaporation cobalt metal film having a thickness of 2,000 Å (the thus obtained sample was named A).

Figure 2:
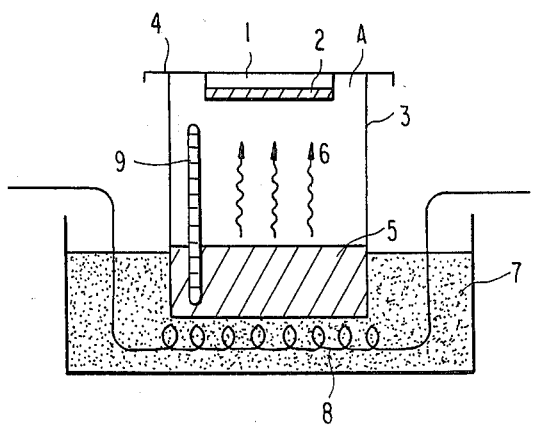

Next, as shown in FIG. 2, which is a diagram illustrating an apparatus for producing vapor of an organic lubricant, butyl stearate indicated at 5 was placed in the lower part of a chamber 3, and the sample A was set beneath a lid 4 of the chamber. Butyl stearate 5 was heated to a temperature of 120° C. by means of a heater 8 through a heat medium 7 to produce vapor 6 of butyl stearate. The thus produced vapor was adhered to the cobalt thin solid film 2 of the sample A. The time taken for exposure of the sample A to butyl stearate vapor 6 was 15 minutes (the thus obtained sample was named B).

The film surface strength of the sample A and that of the sample B respectively were measured with a scratch resistance tester of "HEIDON-18" produced by Shinto Kagaku K.K. using an R ball stylus (R=0.1 mm). Therein, the least load with which the film surface could be scratched was employed as an indication of the film surface strength. The sample A could be scratched with a load of 30 g, while the sample B could be scratched with a load of 60 g. Accordingly, the surface strength higher than that of the sample A by a factor of 2 could be attained by exposure to butyl stearate vapor. No difference in magnetic characteristics between the sample A and the sample B was noticed and that, power loss due to exposure to butyl stearate vapor did not occur.

What is claimed is:

1. A magnetic recording medium comprising a non-magnetic support having thereon a vapor deposited solid film of a ferromagnetic material formed by vacuum evaporation, and on the surface of said ferromagnetic material there being further provided a vapor deposited film of an organic lubricant selected from the group consisting of a paraffin wax, a higher fatty acid, an oxyfatty acid, a fatty acid amide, a fatty acid ester, a fatty alcohol, a metal soap and a mixture thereof or a mixture of the organic lubricant and a macromolecular material.

2. The magnetic recording medium of claim 1, wherein said vapor deposited film of the organic lubricant, or the mixture, is provided by a vacuum evaporation method.

3. The magnetic recording medium of claim 1, wherein said vapor deposited film of the organic lubricant, the macromolecular material or the mixture thereof, is provided by exposing the surface of the magnetic recording medium to the vapor of the organic lubricant, or the mixture under normal pressure.

4. The magnetic recording medium of claim 1, wherein said vapor deposited film of the mixture of the organic lubricant and the macromolecular material is provided by a simultaneous vacuum evaporation method.

5. The magnetic recording medium of claim 4, wherein the ratio of the organic lubricant to the macromolecular material in said mixture is 30% by weight or above.

6. The magnetic recording medium of claim 1, wherein said organic lubricant is a solid having a vapor pressure of $5 \times 10^{-5}$ Torr or lower at room temperature.

7. The magnetic recording medium of claim 1, wherein said vapor deposited film of the macromolecular material is provided by vacuum evaporation method.

8. The magnetic recording medium of claim 1, wherein said macromolecular material is a polyoleffin, a vinyl resin, a vinylidene resin, a polyester, a polycarbonate, a polyamide, a polyacrylonitrile, a polyurethane, a polyether, a cellulose resin or a mixture thereof.

9. A process for preparing a magnetic recording medium which comprises vapor depositing by vacuum evaporation a solid film of a ferromagnetic material on a non-magnetic support and then vapor depositing on said ferromagnetic material a film of an organic lubricant selected from the group consisting of a paraffin wax, a higher fatty acid, an oxyfatty acid, a fatty acid amide, a fatty acid ester, a fatty alcohol, a metal soap and a mixture thereof, or a mixture of the organic lubricant and a macromolecular material.

10. The process of claim 9, wherein the evaporation of the organic lubricant, or the mixture is performed by exposing the surface of the magnetic recording medium to the vapor of the organic lubricant, or the mixture under normal pressure.

11. The process of claim 9, wherein said organic lubricant is a solid having a vapor pressure of $5 \times 10^{-5}$ Torr or lower at room temperature.

12. The process of claim 9, wherein the evaporation of the mixture of the organic lubricant and the macromolecular material is performed by a conventional simultaneous vacuum evaporation technique.

13. The process of claim 12, wherein the ratio of the organic lubricant to the macromolecular material in said mixture is 30% by weight or above.

14. The process of claim 9, wherein the evaporation of the organic lubricant, or the mixture is performed by conventional vacuum evaporation using a resistance heater, vacuum evaporation utilizing electron beam heating, a sputtering process or an ion plating process.

15. The process of claim 9, wherein said macromolecular material is a polyoleffin, a vinyl resin, a vinylidene resin, a polyester, a polycarbonate, a polyamide, a polyacrylonitrile, a polyurethane, a polyether, a cellulose resin or a mixture thereof.

* * * * *